(12) United States Patent
Merz

(10) Patent No.: US 10,753,785 B2
(45) Date of Patent: Aug. 25, 2020

(54) WEIGHING CONVEYING APPARATUS

(71) Applicant: Bizerba SE & Co. KG, Balingen (DE)

(72) Inventor: Karsten Merz, Bisingen (DE)

(73) Assignee: Bizerba SE & Co. KG, Balingen (DE)

( * ) Notice: Subject to any disclaimer, the term of this patent is extended or adjusted under 35 U.S.C. 154(b) by 0 days.

(21) Appl. No.: 16/402,018

(22) Filed: May 2, 2019

(65) Prior Publication Data

US 2019/0376833 A1    Dec. 12, 2019

(30) Foreign Application Priority Data

Jun. 7, 2018  (EP) .................................... 18176604

(51) Int. Cl.
  *B65G 47/28*  (2006.01)
  *G01G 11/00*  (2006.01)
  *B65G 21/20*  (2006.01)

(52) U.S. Cl.
  CPC ....... *G01G 11/003* (2013.01); *B65G 21/2072* (2013.01); *B65G 47/28* (2013.01); *B65G 2203/0258* (2013.01)

(58) Field of Classification Search
  CPC ... G01G 11/003; B65G 47/28; B65G 21/2072
  USPC ............... 198/575, 836.3, 959; 177/119, 145
  See application file for complete search history.

(56) References Cited

U.S. PATENT DOCUMENTS

| 5,684,275 A | 11/1997 | Tolson | |
| 5,684,725 A * | 11/1997 | Numao | G06T 17/10 345/420 |
| 5,814,772 A * | 9/1998 | Nishimura | G01G 11/046 177/145 |
| 6,252,181 B1 * | 6/2001 | Fallas | G01G 15/00 177/119 |
| 6,553,331 B2 * | 4/2003 | Sakagami | G01G 15/00 177/119 |

(Continued)

FOREIGN PATENT DOCUMENTS

| EP | 1 013 587 A2 | 6/2000 |
| JP | S59-17442 A | 1/1984 |
| WO | 2018/054563 A1 | 3/2018 |

OTHER PUBLICATIONS

European Search Report dated Dec. 19, 2018 in corresponding European patent application No. 18176604.9 (three pages).

*Primary Examiner* — Douglas A Hess
(74) *Attorney, Agent, or Firm* — Kilpatrick Townsend & Stockton LLP

(57) ABSTRACT

Disclosed is a weighing conveying apparatus for goods, having at least one conveyor belt, and a weighing belt arranged downstream of the conveyor belt in the conveying direction, wherein the respective conveyor belt includes a belt body having an upper side and a transport belt running around the belt body in operation of the weighing conveying apparatus, and wherein the at least one conveyor belt is provided with a respective alignment rail at both sides in the conveying direction, with the two alignment rails serving for the alignment of the goods. The width of the respective transport belt is smaller than the spacing of the two alignment rails from one another, with the respective transport belt being arranged between the two alignment rails, and with the upper edge of the upper run of the respective transport belt being arranged above the lower edges of the alignment rails.

18 Claims, 3 Drawing Sheets

(56) References Cited

U.S. PATENT DOCUMENTS

| | | | | |
|---|---|---|---|---|
| 6,949,710 B2* | 9/2005 | Conard | ............... | G01G 19/005 |
| | | | | 177/145 |
| 7,408,124 B2* | 8/2008 | Fochler | ................ | B65G 15/14 |
| | | | | 177/145 |
| 7,531,758 B2* | 5/2009 | Grove | ................ | G01G 11/003 |
| | | | | 177/119 |
| 8,613,354 B2* | 12/2013 | Seger | ................ | B65G 21/2072 |
| | | | | 198/500 |
| 8,783,447 B1* | 7/2014 | Yohe | ................ | B65G 21/2054 |
| | | | | 198/626.5 |
| 8,841,565 B2* | 9/2014 | Herrmann | ............... | B67C 3/202 |
| | | | | 141/83 |
| 9,061,784 B2* | 6/2015 | Korthauer | ................ | B65C 9/28 |
| 9,545,114 B2* | 1/2017 | Pedersen | ............ | A22C 17/0093 |
| 9,839,169 B2* | 12/2017 | Narita | ................ | H05K 13/0061 |

\* cited by examiner

WEIGHING CONVEYING APPARATUS

This application claims priority to European Patent Application No. 18176604.9, filed Jun. 7, 2018, the disclosure of which is incorporated by reference herein.

The present invention relates to a weighing conveying apparatus for goods, in particular for packaging, in particular a price labeler, comprising at least one conveyor belt, in particular a feed belt and/or a separating belt, and a weighing belt arranged downstream of the conveyor belt in the conveying direction, wherein the respective conveyor belt comprises a belt body having an upper side and a transport belt running around the belt body in operation of the weighing conveying apparatus, and wherein the at least one conveyor belt is provided with a respective alignment rail at both sides in the conveying direction, with the two alignment rails serving for the alignment of the goods.

Figure 1:
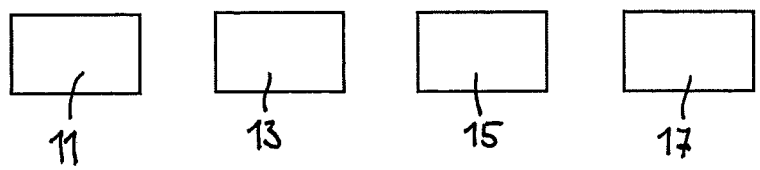

A price labeler is an apparatus that is used in retail to provide goods with price labels. In a typical configuration as is shown in FIG. 1, a price labeler comprises a feed belt for goods coming from a packaging machine, a separating belt adjoining the feed belt to separate the goods, a weighing belt that adjoins the separating belt and at which the goods are weighed, and at least one labeling belt that adjoins the weighing belt and in whose region a respective labeler is located that applies a respective label with the weight and associated price of the good to the goods.

Furthermore, with such a price labeler, alignment rails are typically also present that extend in the conveying direction and that are arranged above the feed belt and/or above the separating belt. The alignment rails serve, for example, to align rectangular goods or products such that two product edges are aligned in parallel with the conveying direction. It can thereby be ensured that the labels are applied during labeling such that the label edges extend in parallel with the product edges so that the labels are not seated skewed on the products.

With new, innovative skin packaging or skin packs, the product to be packed, for example a piece of meat, fish, or sausage, is placed on a product carrier to be covered composed of cardboard, with said product carrier being able to be printed on one side or on both sides. The cardboard is subsequently covered together with the typically centrally positioned product by a transparent film having tight contact after vacuum application.

A skin pack is substantially only as high at its margin as the cardboard is thick. Such packs can therefore run beneath the alignment rails or can jam in the gap formed between the alignment rails and the respective conveyor belt, said gap being marked by an arrow in the conveyor belt known from the prior art in accordance with FIG. 2. The skin packs can then either not be aligned or they produce a product jam.

It is therefore the underlying object of the invention to provide a weighing conveying apparatus of the initially named kind that can also process skin packs without disruption.

This object is satisfied by a weighing conveying apparatus having the features of claim 1 and in particular in that the width of the respective transport belt is smaller than the spacing of the two alignment rails from one another, with the respective transport belt being arranged between the two alignment rails, and with the upper side of the upper run of the respective transport belt being arranged above the lower edges of the alignment rails.

The invention is characterized in that transport belts are used that are narrower than known from the prior art, with the space thereby gained at both sides being used to arrange the alignment rails lower than known from the prior art, namely with their lower edges below the upper side of the upper run of the transport belts. The cardboard of a skin pack lying on the respective transport belt is then always arranged above the lower edges of the alignment rails so that a jamming or an unaligned running through such as is described with respect to the prior art can be prevented.

The solution in accordance with the invention ultimately requires that transport belts are used that are narrower than the width of the packs to be labeled. An alignment of the packs could otherwise not take place. The weighing conveying apparatus in accordance with the invention having the transport belt or belts that is/are narrower with respect to the prior art can, however, not only be operated with the above-explained skin packs, but rather also with conventional packaging.

The solution in accordance with the invention is, however, less suitable for rectangular tray packaging, in contrast, since the latter frequently has integrally formed feet at its corners. It is then necessary with such packaging that the transport belts have a greater width than the packaging since there is otherwise the risk that the packaging lies centrally on the respective transport belt and the downwardly projecting feet are caught at the respective belt body. There are therefore by all means benefits overall when the width of the transport belts is greater than the width of the packaging since the packaging—no matter of what type—cannot come into contact with the belt bodies. The present invention deliberately dispenses with this benefit to implement the other advantages described in connection with the skin packs.

The alignment rails are preferably each seated on the respective belt body such that there is no gap present between the alignment rails and the respective belt body, or at most due to tolerances, so that a damaged skin pack with downwardly kinked cardboard can also not catch there. A direct mounting of the alignment rails is only possible with a stationary belt body, but not with a running transport belt. Alternatively, the alignment rails can each be arranged at a spacing above the respective belt body, i.e. such that the lower edges of the alignment rails are each arranged above the upper side of the belt body and in each case at least not completely to the side outside the belt body.

The alignment rails are in particular each fastened to a rack of the weighing conveying apparatus via a respective holder. It would, however, generally also be conceivable that the alignment rails are fastened, in particular laterally, to the belt body or bodies or to one of a plurality of belt bodies.

At least one alignment rail, in particular the respective alignment rails, is/are adjustable, in particular continuously, via a respective adjustment mechanism transversely, in particular perpendicular, to the conveying direction, in particular between a respective inwardly disposed, in particular extended, end position and a respective outwardly disposed, in particular retracted, end position such that the spacing of the two alignment rails from one another, i.e. their mutual spacing, is adaptable to different package widths. The adjustment in particular takes place in a horizontal direction. It is preferred here if the width of the respective transport belt is smaller in all the adjustment positions of the alignment rail or of the two alignment rails than the spacing of the two alignment belts from one another, with the respective transport belt being arranged between the two alignment rails, and with the upper edge of the upper run of the respective transport belt being arranged above the lower edges of the alignment rails.

The respective adjustment mechanism can have a scissor construction, in particular in the manner of a scissor lift, having two scissor arms that are arranged crossed and that are connected to one another in an articulated manner at their centers to adjust the respective alignment rail between the extended end position and the retracted end position. Such a scissor construction can be implemented simply, on the one hand, and in a stable manner, on the other hand.

The four ends of the two scissor arms can be supported via two fixed bearings and two slotted controls at the respective alignment rail and at a respective holder for the respective alignment rail. One of the fixed bearings and/or one of the slotted controls can, in particular respectively, comprise a locking screw to fix the scissor construction in its respectively set position.

The alignment rails can furthermore each be vertically adjustable, in particular in that a respective holder for the respective alignment rail is vertically adjustably fastened to a rack of the weighing conveying apparatus. The alignment rails can then be used with a narrow transport belt in a lower end position and with a conventional wide transport belt in an upper end position, where the alignment rails are then arranged above the transport belt and at a spacing from it such as is known from the prior art. This increases the flexibility of the weighing conveying apparatus since the option is hereby provided of converting a weighing conveying apparatus known from the prior art from normal standard packaging to the aforesaid skin packs by making use of new transport belts having different widths and/or of new belt bodies having transport belts of different widths without replacing the alignment rails.

It generally applies that the respective belt body can be fastened to a rack of the weighing conveying apparatus via a respective quick-closure and/or that the respective transport belt can be attached to the respective belt body via a respective quick-closure. It is in particular possible in this case that the respective belt body is fastened to a rack of the weighing conveying apparatus, with the fastening being releasable without tools and/or that the respective transport belt is releasable from the belt body without tools. The aforesaid conversion from normal packaging to skin packs can be carried out simply by a simple replaceability of the transport belts and/or of the belt bodies.

It is in particular preferred in connection with a conversion as has been described above if the weighing conveying apparatus comprises a set of transport belts having different widths and/or a set of conveyor belts having transport belts of different widths that can selectively be used for the operation of the weighing conveying apparatus.

The weighing belt preferably comprises a belt body and a transport belt that runs around the belt body in operation of the weighing conveying apparatus and whose width is greater than the spacing of the two alignment rails from one another. It can thereby be precluded that a package contacts the belt body of the weighing belt on crossing the weighing belt, whereby not only the package can be braked and rotated, but also whereby an unwanted force bypass can arise during weighing.

The present invention further relates to a method of operating a weighing conveying apparatus for goods, in particular for packaging, in particular a price labeler, having at least one conveyor belt, in particular a feed belt and/or a separating belt, and a weighing belt arranged downstream of the conveyor belt in the conveying direction, wherein the respective conveyor belt comprises a belt body having an upper side and a transport belt running around the belt body in operation of the weighing conveying apparatus, and wherein the at least one conveyor belt is provided with a respective alignment rail at both sides in the conveying direction, said alignment rails serving the alignment of the goods, with the at least one conveyor belt being operated with goods whose widths are greater than the width of the respective conveyor belt.

Further advantageous embodiments of the invention are described in the dependent claims, in the description of the Figures and in the drawing.

Figure 2:
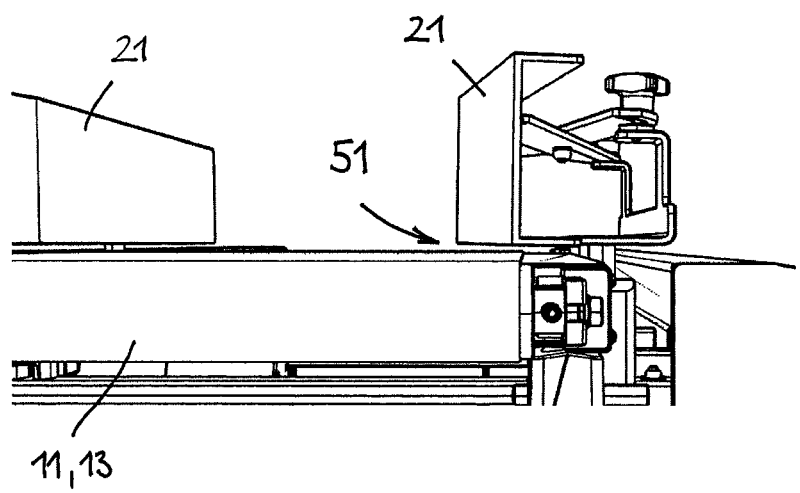
Figure 3:
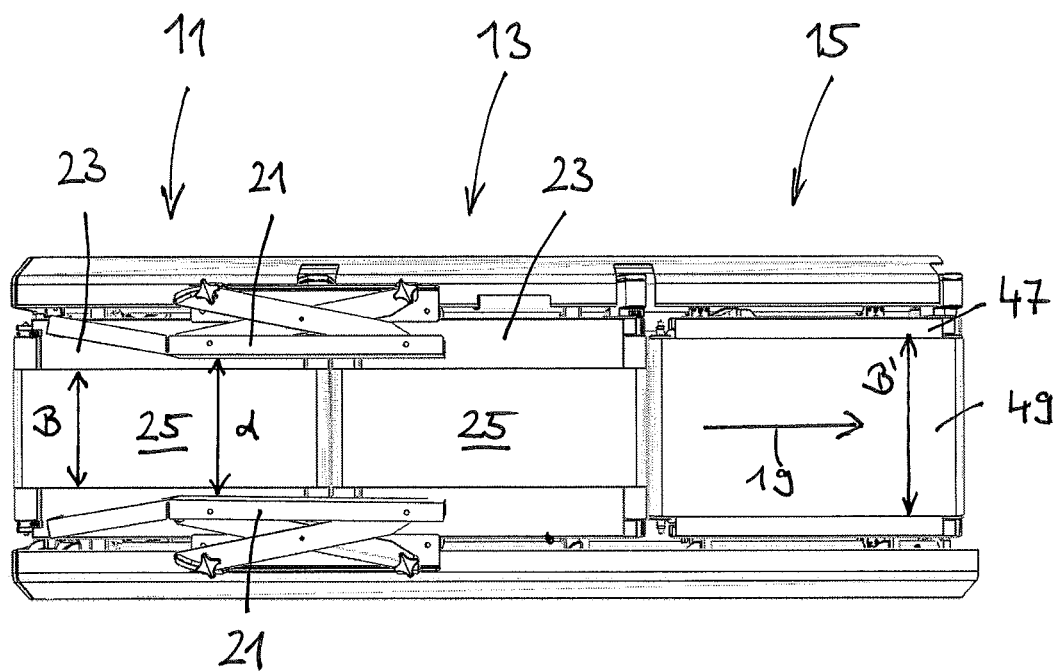
Figure 4:
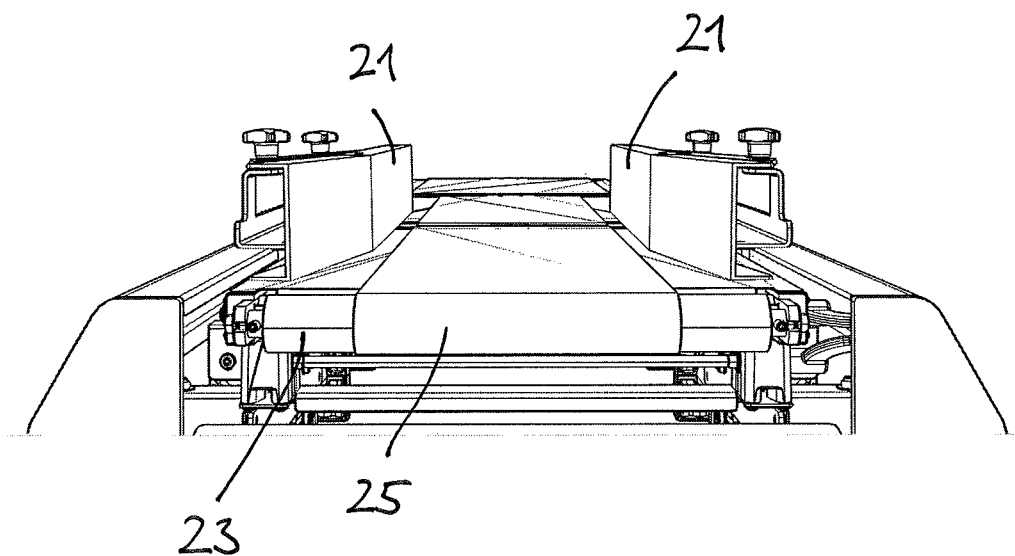
Figure 5:
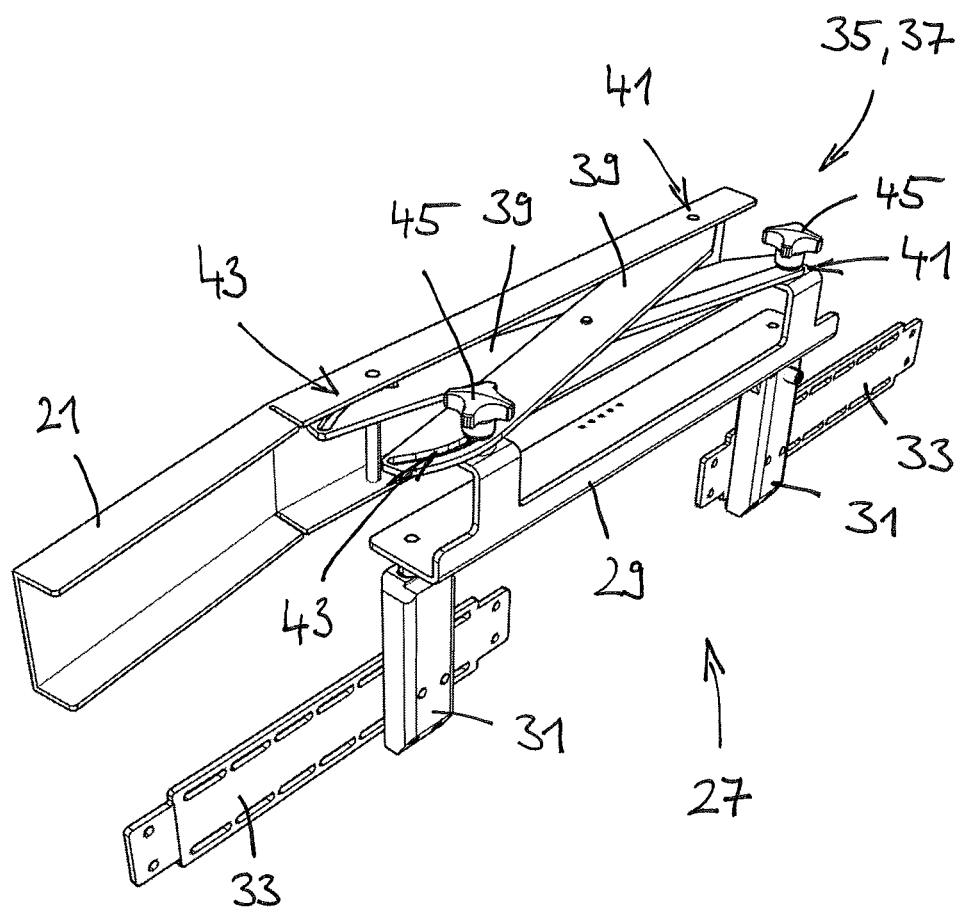

The invention will be described in the following by way of example with reference to the drawing. There are shown FIG. 1 a schematic representation of a configuration of a price labeler known from the prior art;

FIG. 2 a conveyor belt known from the prior art having alignment rails;

FIG. 3 a weighing conveying apparatus in accordance with the invention with a left and a right alignment rail in a plan view;

FIG. 4 the weighing conveying apparatus of FIG. 3 in a perspective frontal view; and FIG. 5 the right alignment rail of FIG. 3.

The price labeler shown in FIGS. 3 and 4 comprises a feed belt 11, a separating belt 13, a weighing belt 15, and a labeling belt, not shown, that is provided with reference numeral 17 in FIG. 1 to weigh and label packed goods delivered from a packaging machine, not shown. To correctly position and correctly align the packaging for the labeling, a respective alignment rail 21 is provided to the left and right of the feed belt 11 and of the separating belt 13 in the conveying direction 19. The two alignment rails 21 each extend in the conveying direction 19, wherein they together form a funnel-like section at the belt inflow side which is adjoined by a further section in which the two alignment rails 21 extend in parallel with one another.

The feed belt 11 and the separating belt 13 each comprise a belt body 23 and a transport belt 25 that is spanned around the respective belt body 23 and that runs around the respective belt body 23 in operation. The two transport belts 25 have an identical width B and are aligned with one another as are the two belt bodies 23. As can be recognized from FIGS. 3 and 4, the width B of the two transport belts 25 is smaller than the mutual spacing d of the two alignment rails 21 and the two transport belts 25 are arranged between the two alignment rails 21. The width of the transport belts 25 is also smaller than the width of the belt bodies 23.

Since the two alignment rails 21 are located to the left and right of the transport belts 25—and not above the transport belts 25—the alignment rails 21 can also be seated on the belt bodies 23 so that—unlike as known from the prior art in accordance with FIG. 2—no gap 51 is produced below the alignment rails 21. This prevents the carrier cardboard from being able to move under the alignment rails 21 with so-called skin packs. In such a case, the skin pack would then either not be aligned if the carrier cardboard simply runs underneath the alignment rail 21 or the skin pack jams beneath the alignment rail 21, whereby a product jam is triggered. The two alignment rails 21 can generally also be arranged at a little distance above the belt bodies 23. It is, however, important that the lower edge of the alignment rails 21 extends beneath the upper side of the upper run of the transport belt 25 since then the carrier cardboard of a skin pack lying on the respective transport belt 25 nevertheless still abuts the respective inner side of the respective alignment rail 21 and does not move beneath it unless the carrier cardboard is warped or kinked in an individual case.

The weighing belt 15 likewise comprises a belt body 47 and a transport belt 49 running around the belt body 47 in operation of the weighing conveying apparatus. The width B' of the transport belt 49 of the weighing belt 15 is greater than the width B of the transport belt 25 of the feed belt 11 and of the separating belt 13 and is also greater than the spacing d of the two alignment rails 21 from one another. It is hereby precluded that a pack located on the weighing belt 15 contacts the belt body 47 of the weighing belt 15, which can result in a rotation of the pack and/or in a non-tolerable force bypass on weighing.

The alignment rails 21 are each mounted at a rack of the weighing conveying apparatus by means of a respective holder 27 (cf. FIG. 5). The respective holder 27 comprises a longitudinal member 29 at which the respective alignment rail 21 is mounted, two vertical members 31 connected to the longitudinal member 29, and two metal mounting sheets 33 that are fixedly screwed to the rack. Provision can generally also be made that the holders 27 can be mounted vertically adjustable at the rack, for example via corresponding elongate holes, which is, however, not shown. It is hereby made possible that the weighing conveying apparatus can be simply converted to wider transport belts 25, in which case the alignment rails 25 are then no longer arranged next to the transport belts 25, but above them, such as is possible without problem for different packaging than skin packs.

It is therefore of advantage if the belt bodies 23 and/or the transport belts 25 are mounted at the rack or at the belt bodies 25 via quick closures and/or can be removed and put on without tools. A conversion can take place simply and fast by a storage of a plurality of belt bodies 23 having transport belts 25 of different widths and/or having a plurality of transport belts 25 of different widths.

The alignment rails 21 are each adjustable perpendicular to the conveying direction 19 via a respective adjustment mechanism 35 that is configured in the manner of a scissor lift. The spacing d of the two alignment rails 21 with respect to one another is thus adaptable to packaging of different widths. The respective adjustment mechanism 35 comprises a scissor construction 37 having two scissor arms 39 that are arranged crossed and that are connected to one another in an articulated manner at their centers. The two scissor arms 39 are supported via a total of two fixed bearings 41 and two slotted controls 43 at the respective alignment rail 21, on the one hand, and at the respective holder 27, on the other hand. The respective alignment rail 21 between an outwardly disposed end position in which the scissor construction is retracted and a further inwardly disposed end position in which the scissor construction is extended can hereby be continuously adjusted. The two supports 41, 43 at the respective holder 27, namely a fixed bearing 41 and a slotted control 43, here each comprise a locking screw 45 to lock the scissor construction 37 in the respectively set travel position.

REFERENCE NUMERAL LIST 11 feed belt
13 separating belt
15 weighing belt
17 labeling belt
19 conveying direction
21 alignment rail
23 belt body
25 transport belt
27 holder
29 longitudinal member
31 vertical member
33 metal mounting sheet
35 adjustment mechanism
37 scissor construction
39 scissor arm
41 fixed bearing
43 slotted control
45 locking screw
47 belt body
49 transport belt
51 gap
B, B' width
d spacing

The invention claimed is:

1. A weighing conveying apparatus for goods, the weighing conveying apparatus having at least one conveyor belt and a weighing belt arranged downstream of the conveyor belt in the conveying direction,
wherein the respective conveyor belt comprises a belt body having an upper side and a transport belt running around the belt body in operation of the weighing conveying apparatus;
wherein the at least one conveyor belt is provided with a respective alignment rail at both sides in the conveying direction, with the two alignment rails serving for the alignment of the goods; and
wherein the width of the respective transport belt is smaller than the spacing of the two alignment rails from one another, with the respective transport belt being arranged between the two alignment rails, and with the upper side of the upper run of the respective transport belt being arranged above the lower edges of the alignment rails.

2. The weighing conveying apparatus in accordance with claim 1,
wherein the alignment rails are each seated on the respective belt body or are each arranged at a spacing above the respective belt body.

3. The weighing conveying apparatus in accordance with claim 1,
wherein the alignment rails are each fastened to a rack of the weighing conveying apparatus via a respective holder.

4. The weighing conveying apparatus in accordance with claim 1,
wherein at least one alignment rail is adjustable transversely to the conveying direction via a respective adjustment mechanism.

5. The weighing conveying apparatus in accordance with claim 4,
wherein the at least one alignment rail is adjustable transversely to the conveying direction between a respective end position at an inner side and a respective end position at an outer side.

6. The weighing conveying apparatus in accordance with claim 4,
wherein the at least one alignment rail is adjustable transversely to the conveying direction between a respective extended end position at the inner side and a respective retracted end position at the outer side.

7. The weighing conveying apparatus in accordance with claim 6,
wherein the respective adjustment mechanism has a scissor construction having two scissor arms that are arranged crossed and that are connected to one another in an articulated manner at their centers to adjust the respective alignment rail between the extended end position and the retracted end position.

8. The weighing conveying apparatus in accordance with claim 7, wherein four ends of the two scissor arms are supported via two fixed bearings and two slotted controls at the respective alignment rail and at a respective holder for the respective alignment rail.

9. The weighing conveying apparatus in accordance with claim 8,
wherein at least one of the fixed bearings and the slotted controls comprises a locking screw to fix the scissor construction in a respectively set position.

10. The weighing conveying apparatus in accordance with claim 1,
wherein the alignment rails are each vertically adjustable.

11. The weighing conveying apparatus in accordance with claim 10,
wherein a respective holder for the respective alignment rail is vertically adjustably fastened to a rack of the weighing conveying apparatus.

12. The weighing conveying apparatus in accordance with claim 1,
wherein the respective belt body is fastened via a respective quick-closure to a rack of the weighing conveying apparatus.

13. The weighing conveying apparatus in accordance with claim 1,
wherein the respective transport belt is attached via a respective quick-closure to the respective belt body.

14. The weighing conveying apparatus in accordance with claim 1,
wherein the respective belt body is fastened to a rack of the weighing conveying apparatus, with the fastening being releasable without tools.

15. The weighing conveying apparatus in accordance with claim 1,
wherein the respective transport belt is releasable from the belt body without tools.

16. The weighing conveying apparatus in accordance with claim 1,
wherein the weighing conveying apparatus comprises at least one of a set of transport belts having different widths and a set of conveyor belts having transport belts of different widths that can be selectively used for the operation of the weighing conveying apparatus.

17. The weighing conveying apparatus in accordance with claim 1,
wherein the weighing belt comprises a belt body and a transport belt that runs around the belt body in operation of the weighing conveying apparatus and whose width is greater than the spacing of the two alignment rails from one another.

18. The weighing conveying apparatus in accordance with claim 1,
wherein the weighing conveying apparatus is a price labeler.

* * * * *